US010752256B2

(12) United States Patent
Wulf et al.

(10) Patent No.: US 10,752,256 B2
(45) Date of Patent: Aug. 25, 2020

(54) METHOD AND DEVICE FOR CONTROLLING AT LEAST ONE DRIVER INTERACTION SYSTEM

(71) Applicant: Robert Bosch GmbH, Stuttgart (DE)

(72) Inventors: Felix Wulf, Ludwigsburg (DE); Andreas Korthauer, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 152 days.

(21) Appl. No.: 16/062,520

(22) PCT Filed: Nov. 10, 2016

(86) PCT No.: PCT/EP2016/077258
§ 371 (c)(1),
(2) Date: Jun. 14, 2018

(87) PCT Pub. No.: WO2017/102188
PCT Pub. Date: Jun. 22, 2017

(65) Prior Publication Data
US 2019/0009793 A1    Jan. 10, 2019

(30) Foreign Application Priority Data

Dec. 16, 2015 (DE) .......................... 10 2015 225 393
Apr. 21, 2016 (DE) .......................... 10 2016 206 771

(51) Int. Cl.
*B60W 50/08* (2020.01)
*B60W 50/10* (2012.01)

(52) U.S. Cl.
CPC .......... *B60W 50/087* (2013.01); *B60W 50/10* (2013.01); *B60K 2370/175* (2019.05); *B60W 2420/42* (2013.01)

(58) Field of Classification Search
CPC .............. B60W 50/087; B60W 50/10; B60W 2420/42; B60K 2370/175
(Continued)

(56) References Cited

U.S. PATENT DOCUMENTS 6,927,694 B1 * 8/2005 Smith .................. B60K 28/066
340/573.1
2012/0320080 A1    12/2012 Giese et al.
(Continued)

FOREIGN PATENT DOCUMENTS

DE    102009050404 A1    5/2011
DE    102012012697 A1    1/2014
WO    2010007505 A1    1/2010

OTHER PUBLICATIONS

International Search Report for PCT/EP2016/077258, dated Feb. 17, 2017.

*Primary Examiner* — Marthe Y Marc-Coleman
(74) *Attorney, Agent, or Firm* — Norton Rose Fulbright US LLP; Gerard Messina

(57) ABSTRACT

A method for controlling at least one driver interaction system. The method includes reading-in data regarding at least one body part of a driver of the vehicle and an interaction signal which represents a detected interaction of the driver, including at least one operating unit for operating a driving function of the vehicle. The method also includes carrying-out a classification of the interaction of the driver as purposeful or incidental by utilizing the data. Moreover, the method includes generating a control signal for controlling at least one driver interaction system as a function of a result of the classification.

16 Claims, 2 Drawing Sheets

(58) Field of Classification Search
USPC .......................................................... 701/36
See application file for complete search history.

(56) References Cited

U.S. PATENT DOCUMENTS

| | | | |
|---|---|---|---|
| 2013/0024090 A1* | 1/2013 | Minase | B60W 30/1882 701/102 |
| 2014/0025263 A1* | 1/2014 | Geyer | B60K 35/00 701/49 |
| 2014/0160048 A1 | 6/2014 | Conway et al. | |
| 2015/0105939 A1* | 4/2015 | Blaesing | G06F 3/017 701/1 |
| 2015/0274178 A1 | 10/2015 | Tsuyunashi et al. | |
| 2016/0107642 A1* | 4/2016 | Salgado | B60W 50/10 701/1 |

\* cited by examiner

METHOD AND DEVICE FOR CONTROLLING AT LEAST ONE DRIVER INTERACTION SYSTEM

FIELD OF THE INVENTION

The present invention is directed to a device or a method according to the definition of the species in the independent claims. A computer program is also a subject matter of the present invention.

BACKGROUND INFORMATION

Driver assistance systems may detect, in an automatic or semi-automatic driving operation, a take-over intention of a driver, for example with the aid of sensors on the pedals and the steering wheel. As soon as a certain movement of a pedal or a momentum on the steering wheel is perceived, this may be interpreted as an intentional take-over by the driver.

Patent document DE 10 2009 050 404 A1 discusses a method for controlling the operation of a fully automatic driver assistance system of a motor vehicle, which is configured for independent vehicle guidance, and a motor vehicle.

SUMMARY OF THE INVENTION

Against this background, the approach presented here provides a method, and a device, which utilizes this method, and finally a corresponding computer program according to the main claims. Advantageous refinements of and improvements on the device described in the independent claim are possible as a result of the measures set forth in the dependent claims.

According to specific embodiments of the present invention, in particular, a driver-vehicle interaction of the driver, for example with the aid of a skeleton model of the driver, may be classified into intentional and unintentional interactions. In other words, in particular, a method for classifying a take-over intention of a driver during automated driving may be provided. A utilization of such a method may be made possible, for example, for distinguishing between an intentional take-over and an unintentional take-over of a vehicle control during automated driving. Therefore, in particular, a method may be presented for precisely classifying a take-over intention of a driver with the aid of sensors.

Advantageously, according to specific embodiments of the present invention, road safety may be enhanced, since, in the case of automated driver assistance systems in particular, a handover of the driving task from the system to the driver may be made more reliable, safe, and simple. In this way, in particular, an automated driver assistance system or a driver assistance system for automated driving may be deactivated, in a reliable way, at a point in time intended by the driver. Unintentional deactivations due to incidental movements of the driver may be avoided.

A method for controlling at least one driver interaction system for a vehicle is presented, the method including the following steps:
reading in data regarding at least one body part of a driver of the vehicle and
reading in an interaction signal which represents a detected interaction of the driver with at least one operating unit for operating the driver interaction system of the vehicle;
carrying out a classification of the interaction of the driver as purposeful or incidental by utilizing the data; and
generating a control signal for controlling at least one driver interaction system as a function of a result of the classification.

The method may be utilized in order to control the driver interaction system in such a way that the mode of the automated driving is or may be taken back. This may be made possible via a control of the driver assistance, in which a classification of an interaction of a vehicle occupant, for example the driver, takes place. When the interaction is classified as purposeful, position data or the movement behavior of the vehicle occupant, for example, may be evaluated. Depending on the result of such an evaluation, a suitable control signal for initiating the take-back may be generated.

The data may be, for example, data which include a piece of information regarding a position, a state, or an interaction of the at least one body part. Therefore, the data may merely be position data, by way of example.

The state behavior may merely be a movement behavior of the driver, by way of example. Therefore, the behavior may relate to a movement, a position, a state, or an interaction of the driver.

The driver interaction system may be configured for allowing at least semi-autonomous driving of the vehicle.

The at least one driver interaction system may be configured as a multimedia system, in particular as an entertainment, navigation, telematics, and/or driver assistance system.

The at least one driver interaction system may be configured for allowing an at least semi-autonomous driving of the vehicle and, in particular, the control of the driver interaction system includes a take-back of the at least semi-autonomous driving by the driver.

The classification of the interaction of the driver as purposeful or incidental may be carried out by utilizing the interaction signal.

This method may be implemented, for example, in software or hardware or in a hybrid form of software and hardware, for example, in a control unit. The vehicle may be a motor vehicle, in particular a land vehicle, a road vehicle, or the like, for example a passenger car, a truck, or any other type of commercial vehicle. The at least one operating unit may include a pedal, a selector lever, a steering wheel, or the like.

According to one specific embodiment, the method may include a step of generating a three-dimensional body model of the at least one body part of the driver by utilizing the data. In this case, the classification may be carried out in the step of carrying-out by utilizing the body model. The body model may be configured as a skeleton model and, additionally or alternatively, as a surface model. The step of generating may be implemented one time or repeatedly, where the generated body model may be updated with the read-in data. Such a specific embodiment offers the advantage that a behavior of the driver may be classified exactly and accurately by utilizing the body model.

In the step of reading-in as well, data regarding an upper body, at least one arm and, additionally or alternatively, at least one leg of the driver are read in. Such a specific embodiment offers the advantage that, in particular, interactions of the driver with the steering wheel and, additionally or alternatively, interactions of the driver with the pedals may be more precisely interpreted. For this purpose, the focus of the data or of the body model may lie on the torso, including the arms, or on the legs of the driver.

In this case, in the step of reading-in, the data may be read in continuously or, additionally or alternatively, repeatedly.

Such a specific embodiment offers the advantage that movements of the driver may be monitored, for example, continuously, in order to further increase an accuracy of the classification.

In particular, a control signal may be generated in the step of generating, which may effectuate a deactivation of the at least one driver interaction system and an initiation of a take-over by the driver when the behavior is classified in the step of carrying-out as purposeful, which represents an intentional take-over by the driver. In this case, a control signal may be generated in the step of generating, which may effectuate a staying-activated mode of the at least one driver interaction system when the behavior is classified in the step of carrying-out as incidental, which represents an unintended take-over by the driver. Such a specific embodiment offers the advantage that the at least one driver interaction system may be controlled quickly and safely in order to reach a decision with respect to a take-over intention of the driver.

Furthermore, image data which represent a detected viewing direction and, additionally or alternatively, a head position of the driver of the vehicle may be read in in the step of reading-in. In this case, the classification may be carried out in the step of carrying-out by utilizing the viewing direction and, additionally or alternatively, the head position. Optionally, the method may include a step of detecting the viewing direction and, additionally or alternatively, the head position of the driver by utilizing the image data in this case. Such a specific embodiment offers the advantage that a plausibility check of the behavior and of the result of the classification is made possible. Therefore, the at least one driver interaction system may be controlled more reliably and more appropriately to the situation. For example, camera systems or the like may be capable of detecting or identifying a position of a head and, additionally or alternatively, a viewing direction of a person with the aid of camera data.

According to one specific embodiment, a confidence value for a result of the classification may be determined in the step of carrying-out. In this case, the control signal may be generated as a function of the confidence value in the step of generating. The confidence value may also be referred to as a confidence measure. In this case, the confidence value may function as a weighting factor for weighting the result of the classification.

The confidence value may be determined, for example, by utilizing the viewing direction and, additionally or alternatively, the head position of the driver. Such a specific embodiment offers the advantage that reliability and accuracy of the classification result may be further increased.

The data from an interface to a stereo camera unit, a time-of-flight camera unit and, additionally or alternatively, an interferometric detection unit may also be read in in the step of reading-in. Such a specific embodiment offers the advantage that a precise, rapid, and reliable observation and, optionally, tracking of movements of the driver is made possible. A body model of a person, for example, may be determined and provided with the aid of 3D sensors. Furthermore, the data may be read in, in the step of reading-in, from an interface to an image evaluation unit. The image evaluation unit may be configured for ascertaining the data by utilizing an image captured by an image capturing unit. To this end, the image evaluation unit may be configured for carrying out a suitable image evaluation. Such an image evaluation unit may also be integrated in an image capturing unit, so that the data may be ascertained already in the image capturing unit. In this case, the data volume to be transmitted by the image capturing unit may be reduced.

In addition, the interaction signal from one interface to at least one detection unit for detecting a momentum applied by the driver on the at least one operating unit and, additionally or alternatively, a change in position of the at least one operating unit effectuated by the driver may be read in in the step of reading-in. Such a specific embodiment offers the advantage that a rapid response to a detected interaction may take place, where the interaction may be detected in a reliable and simple way.

The approach presented here furthermore provides a device, which is configured for carrying out, controlling, or implementing the steps of a variant of a method presented here in corresponding units. The object of the present invention may also be rapidly and efficiently achieved with the aid of this embodiment variant of the present invention in the form of a device.

For this purpose, the device may include at least one processing unit for processing signals or data, at least one memory unit for storing signals or data, at least one interface to a sensor or an actuator for reading in sensor signals from the sensor or for outputting data or control signals to the actuator and/or at least one communication interface for reading in or outputting data which are embedded in a communication protocol. The processing unit may be, for example, a signal processor, a microcontroller, or the like, the memory unit being a flash memory, an EPROM, or a magnetic memory unit. The communication interface may be configured for reading in or outputting data in a wireless and/or wire-bound manner, a communication interface, which may read in or output wire-bound data, may read in these data, for example, electrically or optically from a corresponding data transmission line or output these data into a corresponding data transmission line.

In the present case, a device may be understood to be an electrical device that processes sensor signals and, as a function thereof, outputs control and/or data signals. The device may include an interface, which may be in the form of hardware and/or software. In the case of an embodiment as hardware, the interfaces may be part of a so-called system ASIC, for example, which contains highly diverse functions of the device. It is also possible, however, that the interfaces are standalone, integrated circuits or are formed, at least in part, from discrete components. In the case of an embodiment as software, the interfaces may be software modules, which are present, for example, on a microcontroller in addition to other software modules.

In one advantageous embodiment, a control of at least one driver interaction system of a vehicle takes place by the device. For this purpose, the device may access, for example, sensor signals such as data, interaction signals, and, optionally, image data.

The control takes place via the control signal generated with the aid of the device.

In addition, a computer program product or a computer program including program code is advantageous, which may be stored on a machine-readable carrier or memory medium such as a semiconductor memory, a hard drive memory or an optical memory, and which may be used for carrying out, implementing, and/or controlling the steps of the method according to one of the above-described specific embodiments, in particular when the program product or program is carried out on a computer or a device.

Exemplary embodiments of the present invention are represented in the drawings and are described in greater detail in the description which follows.

DETAILED DESCRIPTION

Figure 1:
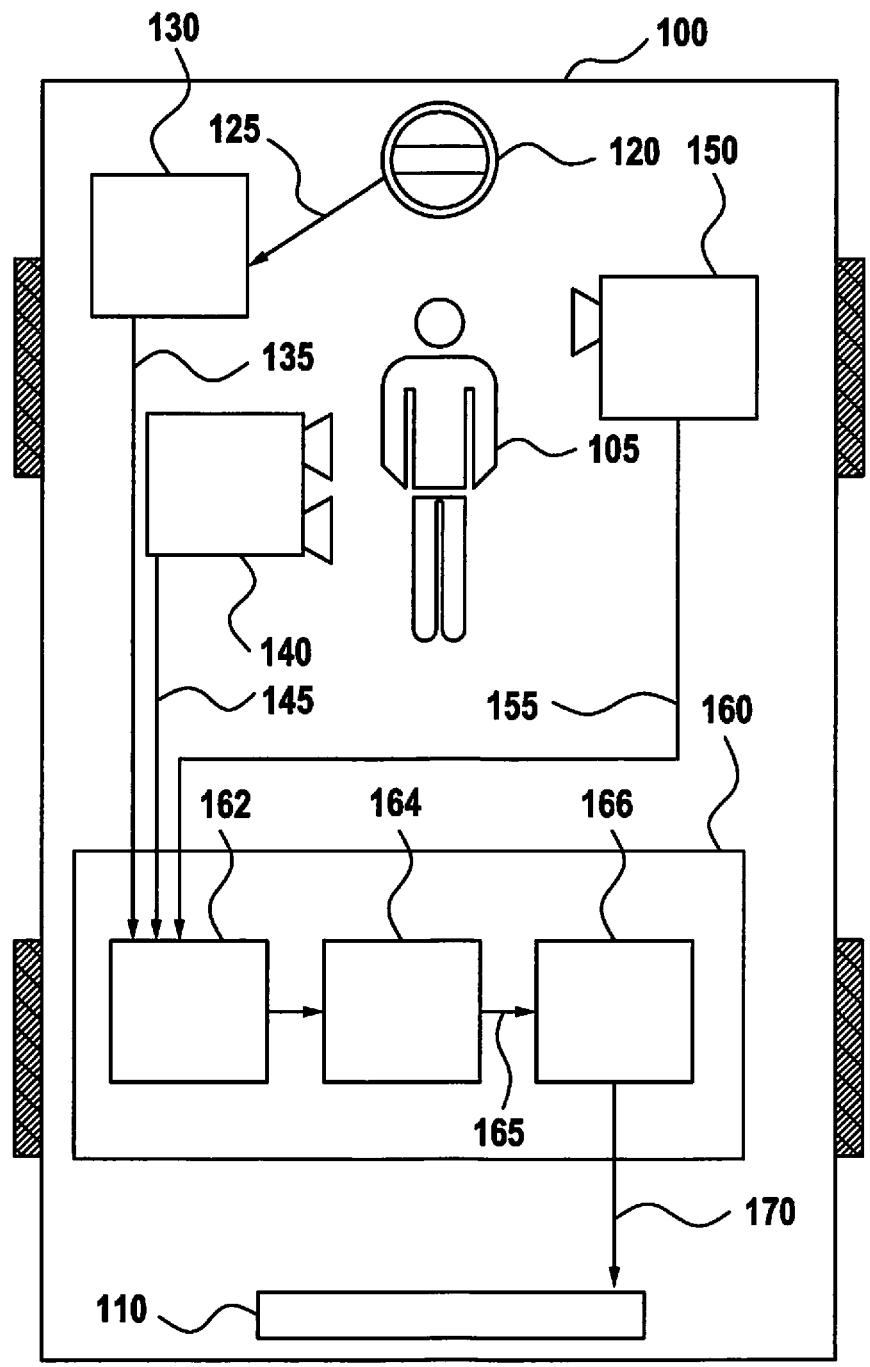
FIG. 1 shows a block diagram of a device for the take-back of an automatedly driving vehicle according to one exemplary embodiment.

In the following description of favorable exemplary embodiments of the present invention, identical or similar reference numerals are used for the similarly functioning elements represented in the different figures, a repeated description of these elements being dispensed with.

FIG. 1 shows a schematic representation of a device situated in a vehicle 100 for controlling at least one driver interaction system according to one exemplary embodiment. Vehicle 100 is a motor vehicle, for example a passenger car or a commercial vehicle. According to the exemplary embodiment represented in FIG. 1, a driver 105 is located in vehicle 100.

According to the exemplary embodiment shown in FIG. 1, a driver interaction system 110, an operating unit 120 in the form of a steering wheel 120, a detection unit 130, a capturing unit 140, a vehicle camera 150, and the device 160 of vehicle 100 are represented merely by way of example. In this case, device 160 is connected to driver interaction system 110, detection unit 130, capturing unit 140, and vehicle camera 150 via one or multiple interfaces so as to be capable of data and signal transmission.

Driver interaction system 110 is configured for allowing at least semi-autonomous driving of vehicle 100. In this case, driver interaction system 110 is configured, in particular, for moving vehicle 100 in road traffic at least partially independently of driver 105. Driver 105 may at least partially hand over a driving task to driver interaction system 110. Driver 105 may also take back the driving task from driver interaction system 110 again or driver interaction system 110 may return or hand over the driving task to driver 105.

Detection unit 130 is configured for detecting a momentum applied by driver 105 onto steering wheel 120. In this case, detection unit 130 is configured for receiving a measuring signal 125 from steering wheel 120 and for generating and providing an interaction signal 135 by utilizing measuring signal 125. Interaction signal 135 represents a detected interaction of driver 105 with an operating unit 120, in this case a detected momentum which is applied by driver 105 onto steering wheel 120.

Capturing unit 140 is configured for capturing and providing data 145 regarding at least one body part of driver 105. In this case, capturing unit 140 according to the exemplary embodiment represented in FIG. 1 is configured as an image capturing unit, specifically as a stereo camera unit in this case. Alternatively, capturing unit 140 may also be configured as a time-of-flight camera unit and/or an interferometric detection unit. According to one exemplary embodiment, data 145 indicate a position of the body part within vehicle 100. A progression of a movement of the body part may be determined from chronologically consecutive data 145. According to one exemplary embodiment, it is determined via an analysis of the progression of the movement whether a behavior of driver 105 including the movement is to be classified as purposeful or incidental.

For example, capturing unit 140 is configured for capturing an image of at least one body part and determining data 145 from the image of the body part by utilizing an image evaluation algorithm. Alternatively, data 145 may include the image of the body part and a suitable evaluation, processing, or analysis of data 145 may be carried out within device 160.

Vehicle camera 150 is configured for recording and providing image data 155 regarding driver 105. In particular, vehicle camera 150 is also configured for detecting a viewing direction and/or head position of driver 105 in recorded raw image data. In this case, image data 155 represent the detected viewing direction and/or head position of driver 105.

Device 160 is configured for controlling the at least one driver interaction system 110. In this case, control device 160 is configured for generating a control signal 170 for controlling driver interaction system 110 by utilizing interaction signal 135 and data 145. For this purpose, control device 160 includes a read-in unit 162, a carrying-out unit 164, and a generating unit 166.

Read-in unit 162 of device 160 is configured for reading in interaction signal 135 from an interface to detection unit 130 and reading in data 145 from an interface to capturing unit 140. Read-in unit 162 is also configured for forwarding interaction signal 135 and data 145 to carrying-out unit 164.

Carrying-out unit 164 is configured for carrying out a classification of the interaction of driver 105 as purposeful or incidental by utilizing data 145 and, optionally, by utilizing interaction signal 135. In other words, carrying-out unit 164 is configured for classifying the interaction of driver 105 as a function of data 145 and, optionally, interaction signal 135 as purposeful or incidental. Furthermore, carrying-out unit 164 is configured for providing a result signal 165 or outputting the result signal to generating unit 166, result signal 165 representing a result of the classification, i.e., an interaction of driver 105 classified as purposeful or incidental.

Generating unit 166 is configured for generating control signal 170 for controlling the at least one driver interaction system 110 as a function of the result of the classification carried out by carrying-out unit 164 or depending on result signal 165. Generating unit 166 or device 160 is also configured for providing control signal 170 for driver interaction system 110 or outputting the control signal to driver interaction system 110.

In particular, generating unit 166 is configured for generating a control signal 170 which effectuates a deactivation of driver interaction system 110 and an initiation of a take-over by the driver when the behavior has been classified by carrying-out unit 164 as purposeful. A behavior classified as purposeful represents an intentional take-over by the driver. Generating unit 166 is also configured, in particular, for generating a control signal 170 which effectuates a staying-activated mode of driver interaction system 110 when the interaction has been classified by carrying-out unit 164 as incidental. An interaction classified as incidental represents an unintentional or non-intentional take-over by the driver.

According to one exemplary embodiment, data 145 captured with the aid of capturing unit 140 relate to an upper body, at least one arm, and/or at least one leg of driver 105. Additionally or alternatively, operating unit 120 may include at least one pedal or a selector lever of vehicle 100. In this case, detection unit 130 may be configured for providing an interaction signal 135 which represents a change in position of such an operating unit 120 effectuated by driver 105.

According to one exemplary embodiment, read-in unit 162 or device 160 is configured for reading in image data 155 from an interface to vehicle camera 150. In this case, read-in unit 162 is also configured for providing read-in image data 155 to carrying-out unit 164. Carrying-out unit 164 is configured for carrying out the classification by utilizing image data 155 representing the viewing direction and/or head position.

Therefore, according to this exemplary embodiment, control signal 170 is generated by additionally utilizing image data 155.

In particular, device 160 according to one exemplary embodiment is configured for generating a three-dimensional body model of the at least one body part of driver 105 by utilizing data 145. In this case, carrying-out unit 164 is configured for carrying out the classification by utilizing the generated three-dimensional body model. The body model is, for example, a three-dimensional skeleton model of driver 105. Device 160 is therefore configured for using the body model generated by utilizing data 145 in order to generate control signal 170.

Figure 2:
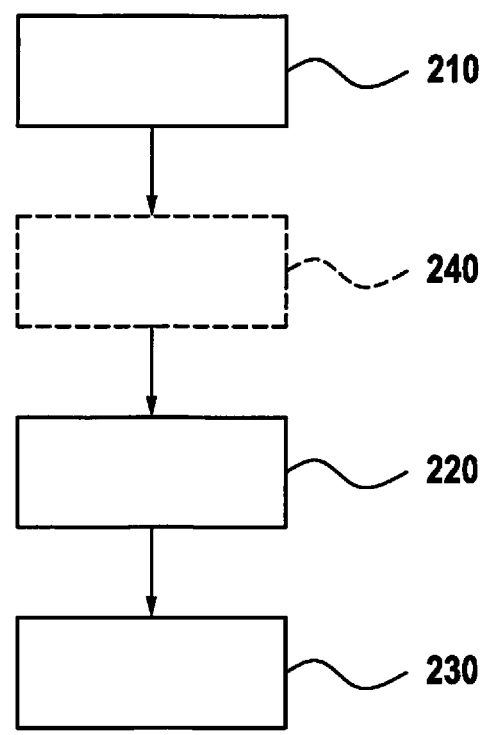
FIG. 2 shows a flow chart of a method for the take-back of an automatedly driving vehicle according to one exemplary embodiment.

FIG. 2 shows a flow chart of a method 200 for controlling at least one driver interaction system according to one exemplary embodiment. Method 200 is executable in order to control at least one driver interaction system for a vehicle. The driver interaction system is configured, in this case, for allowing an at least semi-autonomous driving of the vehicle. Method 200 is executable in connection with or by utilizing the device from FIG. 1 or a similar device. Furthermore, method 200 is also executable in combination with the vehicle from FIG. 1 or a similar vehicle.

Method 200 includes a step 210 of reading-in an interaction signal and data regarding at least one body part of a driver of the vehicle. The interaction signal represents a detected interaction of the driver with at least one operating unit for operating a driving function of the vehicle.

In a step 220 of carrying-out, which is executable following the step 210 of reading-in, a classification of the interaction of the driver as purposeful or incidental is carried out in a method 200 by utilizing the read-in data and, optionally, the read-in interaction signal.

Furthermore, in method 200, a control signal for controlling the at least one driver interaction system is generated in a step 230 of generating, which is executable after step 220 of carrying-out, as a function of a result of the classification carried out in step 220 of carrying-out.

According to one exemplary embodiment, the data are continuously and/or repeatedly read in, in step 210 of reading-in. According to one exemplary embodiment, images which represent a detected viewing direction and/or head position of the driver of the vehicle are read in in step 210 of reading-in. In this case, the classification is carried out in step 220 of carrying-out by utilizing the viewing direction and/or head position represented by the read-in image data.

Optionally, a confidence value for a result of the classification is additionally determined in step 220 of carrying-out, in particular. In this case, the control signal is generated as a function of the confidence value in step 230 of generating.

According to yet another exemplary embodiment, method 200 further includes a step 240 of generating a three-dimensional body model of the at least one body part of the driver by utilizing the read-in data. In this case, step 240 of generating is executable before step 220 of carrying out the classification. In step 240 of generating, the three-dimensional body model may be generated one time and may be continuously updated by utilizing read-in data or may be repeatedly generated by utilizing read-in data. In this case, the classification is carried out in step 220 of carrying-out by utilizing the body model generated in step 240 of generating.

One exemplary embodiment is described in the following, in summary and in other words, with reference to FIGS. 1 and 2. Sensors and methods may be utilized in this case, via the utilization of which a three-dimensional skeleton model of driver 105 may be created, for example. In this case, an upper-body area and, additionally or alternatively, a leg area of driver 105 may be of particular relevance.

During an at least partially automated driving operation of vehicle 100, take-overs by the driver are classified and controlled by device 160 and/or method 200 as follows. Driver 105 is measured, in particular continuously, with the aid of an existing 3D sensor system or capturing unit 140. Data 145 obtained in this way are processed with the aid of device 160 in order to obtain the three-dimensional skeleton model. With the aid of detection unit 130, a detection of a driver interaction with pedals and/or steering wheel 120 takes place with the aid of common sensors, such as position sensors on the pedals, momentum sensors on the steering wheel, and the like.

When the interaction signal 135 indicates an interaction of driver 105 with pedals or steering wheel 120, the behavior of driver 105 is classified with the aid of the skeleton model with the aid of device 160, for example by utilizing method 200 for the purpose of controlling. In this case, it is classified whether the interaction is purposeful, for example driver 105 places his/her hands on steering wheel 120 and otherwise makes no further movements, or whether the interaction takes place incidentally during another movement, for example driver 105 rotates toward the rear and thereby brushes against steering wheel 120 with his/her hands and/or legs. Image data 155 from a video-based detection of the head position and/or viewing direction may be additionally utilized for checking the plausibility. A take-over intention may be classified as purposeful when the gaze and a head position are directed outside vehicle 100, i.e., driver 105 is not presently distracted and is looking out at least a windshield or a front side window. In addition, a confidence measure for the classification may be calculated during the classification of the interaction of driver 105.

On the basis of the result or result signal 165 of the classification and, if necessary, the confidence measure, it may be decided whether the take-over by the driver is deliberately carried out by driver 105. Depending on the result of this decision, automated driver interaction system 110, in response to control signal 170, will either hand over the driving task to driver 105 and deactivate itself, or remain active.

If an exemplary embodiment includes an "and/or" linkage between a first feature and a second feature, this is intended to be read that the exemplary embodiment according to one specific embodiment includes both the first feature and the second feature and, according to a further specific embodiment, includes either only the first feature or only the second feature.

What is claimed is:

1. A method for controlling at least one driver interaction system for a vehicle, the method comprising:
   reading in data regarding at least one body part of a driver of the vehicle and reading in an interaction signal which represents a detected interaction by physical contact of the driver with an operating unit that causes a physical change of the operating unit, the physical change corresponding to an operation of the driver interaction system of the vehicle;

classifying the physical contact of the driver as being purposeful or unintentional by using the data; and generating a control signal to control the at least one driver interaction system to perform the operation conditional on the physical contact being classified as purposeful in the classification.

2. The method of claim 1, wherein the at least one driver interaction system is configured as a multimedia system, including as an entertainment, navigation, telematics, and/or driver interaction system.

3. The method of claim 1, wherein the at least one driver interaction system is configured for allowing an at least semi-autonomous driving of the vehicle and the control of the driver interaction system includes a take-back of the at least semi-autonomous driving by the driver.

4. The method of claim 3, wherein, in the generating, a control signal is generated, which effectuates a deactivation of the at least one driver interaction system and an initiation of a take-over by the driver when the behavior is classified in the classifying as purposeful, which represents an intentional take-over by the driver, a control signal being generated in the generating, which effectuates a staying-activated mode of the at least one driver interaction system when the behavior is classified in the classifying as unintentional, which represents an unintended take-over by the driver.

5. The method of claim 1, wherein the classification of the interaction of the driver as purposeful or unintentional is performed additionally based on an analysis of the interaction signal.

6. The method of claim 1, further comprising:
generating a three-dimensional body model of the at least one body part of the driver by using the data, the classifying being performed by using the body model in the classifying.

7. The method of claim 1, wherein, in the reading-in, data regarding an upper body, at least one arm, and/or at least one leg of the driver are read in.

8. The method of claim 1, wherein, in the reading-in, the data are continuously and/or repeatedly read in.

9. The method of claim 1, wherein, in the reading-in, image data are read in, which represent a detected viewing direction and/or head position of the driver of the vehicle, the classifying is performed by using the viewing direction and/or head position.

10. The method of claim 1, wherein, in the classifying, a confidence value for a result of the classification is determined, the control signal being generated as a function of the confidence value.

11. The method of claim 1, wherein the data are read in from an interface to a stereo camera unit, a time-of-flight camera unit, an interferometric detection unit, and/or an image evaluation unit.

12. The method of claim 1, wherein the interaction signal is read in from an interface to at least one detection unit for detecting a momentum applied by the driver on the operating unit and/or a change in position of the operating unit effectuated by the driver.

13. The method of claim 1, wherein:
the data regarding the at least one body part includes (a) first data regarding a viewing direction of the driver or a position of a head the driver, which were not used to perform the physical contact, and (b) second data regarding a manner by which a body part of the driver moved to perform the physical contact; and
the classifying is based on both the first data and the second data.

14. A device for controlling at least one driver interaction system for a vehicle, comprising:
a processor configured to perform the following:
reading in data regarding at least one body part of a driver of the vehicle and reading in an interaction signal which represents a detected interaction by physical contact of the driver with an operating unit that causes a physical change of the operating unit, the physical change corresponding to an operation of the driver interaction system of the vehicle;
classifying the physical contact of the driver as being purposeful or unintentional by using the data; and
generating a control signal to control the at least one driver interaction system to perform the operation conditional on the physical contact being classified as purposeful in the classification.

15. A non-transitory computer readable medium on which is stored program code of a computer program that is executable by a processor and that, when executed by the processor, causes the processor to perform a method for controlling at least one driver interaction system for a vehicle, the method comprising:
reading in data regarding at least one body part of a driver of the vehicle and reading in an interaction signal which represents a detected interaction by physical contact of the driver with an operating unit that causes a physical change of the operating unit, the physical change corresponding to an operation of the driver interaction system of the vehicle;
classifying the physical contact of the driver as being purposeful or unintentional by using the data; and
generating a control signal to control the at least one driver interaction system to perform the operation conditional on the physical contact being classified as purposeful in the classification.

16. The computer readable medium of claim 15, wherein the method further comprises:
generating a three-dimensional body model of the at least one body part of the driver by using the data, the classifying being performed by using the body model in the classifying.

* * * * *